(12) United States Patent
Corsaro et al.

(10) Patent No.: US 7,928,321 B2
(45) Date of Patent: Apr. 19, 2011

(54) CURRENT LEAD FOR SUPERCONDUCTING APPARATUS

(75) Inventors: Pietro Corsaro, Busto Arsizio (IT); Gianangelo Cavalleri, Canonica D'Adda (IT)

(73) Assignee: Pirelli & C. S.p.A., Milan (IT)

( * ) Notice: Subject to any disclaimer, the term of this patent is extended or adjusted under 35 U.S.C. 154(b) by 1245 days.

(21) Appl. No.: 10/515,834

(22) PCT Filed: May 31, 2002

(86) PCT No.: PCT/EP02/05944
§ 371 (c)(1),
(2), (4) Date: Aug. 11, 2005

(87) PCT Pub. No.: WO03/103094
PCT Pub. Date: Dec. 11, 2003

(65) Prior Publication Data
US 2006/0086529 A1    Apr. 27, 2006

(51) Int. Cl.
*H01B 12/00*    (2006.01)
(52) U.S. Cl. .................... 174/125.1; 505/231
(58) Field of Classification Search ........... 174/15.4, 174/15.5, 125; 505/230–232
See application file for complete search history.

(56) References Cited

U.S. PATENT DOCUMENTS

| | | |
|---|---|---|
| 4,477,689 A | 10/1984 | Ogasahara et al. |
| 4,695,675 A | 9/1987 | Yamamoto |
| 4,754,249 A | 6/1988 | Yamamoto et al. |
| 5,298,679 A | 3/1994 | Wu et al. |
| 5,563,369 A * | 10/1996 | Yazawa et al. ............ 174/15.4 |
| 5,880,068 A | 3/1999 | Gamble et al. |
| 5,932,523 A * | 8/1999 | Fujikami et al. ............ 505/231 |
| 5,991,647 A | 11/1999 | Brockenborough et al. |

FOREIGN PATENT DOCUMENTS

| | | |
|---|---|---|
| EP | 1 289 067 B1 | 3/2003 |
| GB | 2 294 534 A | 5/1996 |

OTHER PUBLICATIONS

Engelhardt et al., "Application Considerations for HTSC Power Transmission Cables", 5th Annual Conference on Superconductivity and Applications, Buffalo, N.Y. Sep. 24-26, 1991.
Iwasa, "Case Studies in Superconducting Magnets", New York, Plenum Press, pp. 137-138, (1994).
della Porta, "Gettering—An Integral Part of Vacuum Technology", American Vacuum Society, 39th National Symposium, American Vacuum Society, Technical Sheet TP 202.
della Porta, "Gettering—An Integral Part of Vacuum Technology", American Vacuum Society, 39th National Symposium, American Vacuum Society, Technical Sheet TP 202, pp. 1-15, (1992).

\* cited by examiner

*Primary Examiner* — Jeremy C Norris
(74) *Attorney, Agent, or Firm* — Finnegan, Henderson, Farabow, Garrett & Dunner, LLP

(57) ABSTRACT

An electric superconducting system having at least a superconducting apparatus, at least a current lead electrically connecting the superconducting apparatus and an electric network. An electrical conductor having at least a sheet, the electrical conductor defining a heat conducting path of predetermined length through the sheet, and having at least two surfaces mutually facing each other.

21 Claims, 5 Drawing Sheets

CURRENT LEAD FOR SUPERCONDUCTING APPARATUS

CROSS REFERENCE TO RELATED APPLICATION

This application is a national phase application based on PCT/EP02/05944, filed May 31, 2002, the content of which is incorporated herein by reference.

BACKGROUND OF THE INVENTION

1. Field of the Invention

The present invention refers to a current lead for superconducting electrical apparatus.

2. Description of the Related Art

The term "superconducting apparatus" denotes an electrical device such as cable or magnet operating in conditions of so-called superconductivity, i.e. in conditions of almost null resistivity. See, for example, Engelhardt J. S. et al., Application Consideration for HTSC Power Transmission Cable, 5th Annual Conference on Superconductivity and Application, Buffalo, N.Y., Sep. 24-26, 1991, and Yukikazu Iwasa, "Case Studies in Superconducting Magnets", New York, Plenum Press, 1994.

A superconducting cable typically comprises at least one phase conductor including superconducting material, at least one cryogenic fluid flowing channel, an electric insulator (dielectric) and a cryostat generally including two coaxial tubes, and between them a gap, generally under vacuum or at a very low pressure, for example of $10^{-5}$-$10^{-6}$ mbar, or containing a low thermal conductive gas, at least partially filled with a thermal insulator. The cryogenic fluid flowing in said at least one channel is typically helium, nitrogen, hydrogen, argon or mixture thereof, at the liquid or gaseous state, and operates at temperature and pressure specific for the application.

The term "superconducting material" indicates a material having a superconductive phase with substantially null resistivity at temperature values equal or lower a threshold value, defined as critical temperature ($T_c$). For example, special ceramics based on mixed oxide of copper, barium and yttrium (generally known as YBCO), or of bismuth, lead, strontium, calcium and copper (generally known as BSCCO) have $T_c$ ranging from about 60 K (−213° C.) to about 170 K (−103° C.), being commonly denoted with the name of high temperature superconducting (HTS) material.

Advantageously, the operative temperature of a superconducting apparatus is lower than the critical temperature of the superconducting material contained therein, so as to guarantee a safety margin in case of disfunctioning of the devices for setting and maintaining the proper thermal conditions. These devices mainly include said cryogenic fluid flowing into at least one channel, and said cryostat.

Conveniently, each component of said cable should guarantee a minimal heat transmission to the cryogenic fluid, so that the cooling investment and maintenance costs are decreased.

As, for example, said in U.S. Pat. No. 5,991,647, a major source of heat escaping into a cryogenic system typically occurs at the connection of the cryogenic system to the outside world. When the cryogenic system houses an operative superconducting device immersed in a cryogenic fluid, the "connection" is typically through the current leads, through which electrical energy passes to and from the device. The escape of heat through this connection is often referred to as "heat leak".

Typically, a current lead is composed by
a) at least a conductor, where the current runs through,
b) a coolant system generally comprising a cryogenic fluid, such as helium or nitrogen, and pipes for exhausting the vapors of such fluid,
c) a thermal insulation,
d) means for electrically connecting said conductor to both the superconducting termination and the power generation/distribution network (briefly in the following "electric network"), typically operating at temperatures higher than the operative temperature of the superconducting apparatus.

U.S. Pat. No. 4,695,675 discloses an electric lead device for a superconducting electric apparatus, in which the total cross sectional area of conductors in the lead housing can be reduced from the normal temperature side toward the cryogenic temperature side, by stepwise decreasing the number of conductors from the normal temperature side toward the cryogenic temperature side. The conductors are cooled by introducing coolant gas vaporized from a cryogenic coolant, such as helium, stored in a tank. The Applicant observes that the current lead is physically separated from the superconducting apparatus.

U.S. Pat. No. 4,754,249 discloses a current lead structure for superconducting electrical apparatus wherein the conductor(s) is spirally configured. The applicant observes that the term "spirally" is incorrectly used therein, as FIG. 2 of this patent is showing a conductor in helical form, not in a planar configuration as would be required according to the geometric meaning of the word "spiral". Such "helical" configuration greatly increases the overall length of the conductor and thus the length of the heat conduction path defined thereby, while at the same time correspondingly increasing its overall surface area to thus enhance the cooling of the conductor by the exhausting helium gas. At the same time, this configuration of the conductor enables its axial length to be reduced as necessary to accommodate design size criteria for the overall apparatus. This current lead is physically separated from the superconducting apparatus. The conductor is disposed in a pipe having thermal and electrical insulating material applied to its inner surface. Also, as cooling medium acting on the conductor surface, the gaseous phase of a liquid coolant and pipe(s) for exhausting said gaseous phase are used.

The use of a superconducting conductor in the current lead has been proposed. U.S. Pat. No. 5,880,068 relates to a high-temperature superconductor (HTS) lead for a cryogenic magnetic system, formed by a plurality of HTS lead elements including a series of HTS plates disposed each other in non-collinear arrangements or "zig-zag" configuration. Said HTS lead plates are composed by stacks of superconducting tapes and are placed onto a support with ends connected to copper end pieces. The cryogenic magnet system includes an enclosure, for example, a dewar cylinder held under a vacuum, containing a low or high temperature superconductor magnet and high-temperature superconductor leads.

The heat generation has to be controlled in view of the near superconducting apparatus requiring the above-mentioned thermal conditions (very cold environment) to operate. Such a control is effected by a refrigeration system generally comprising a cryogenic fluid, such as helium or nitrogen, contacting the surface of the conductor. The heat leak causes the cryogenic fluid to warm up. Due to the temperature difference and limitations of liquefier efficiency, the refrigeration power required to recondense the cryogenic vapor back to the liquid state or to cool down the cryogenic fluid generally is several hundred to over a thousand times the heat leak to the cryogen pool. A substantial reduction in refrigeration system capital cost as well as the operating cost can therefore be achieved by the reduction of heat leak to the cryogenic system.

The heat generation due to Joule effect can be reduced by increasing the conductor section (S), thus decreasing the resistance, while the heat conduction can be reduced by increasing the length (L). Yukikazu Iwasa, supra, page 137 (eq. 4.25), discloses that for minimizing the heat leak to the cooling medium, the ratio L/S has to be $$\frac{L}{S} = \sqrt{\frac{2\bar{k}(T_1 - T_0)}{\bar{\rho}} \cdot \frac{1}{I_t}}$$

wherein

L is the length of the current lead conductor(s) from the room (or normal) temperature end to the cryogenic temperature end, i.e. the length over which the temperature gradient occurs;

S is the conductor section;

$\bar{k}$ is the average thermal conductivity $\bar{\rho}$ is the average electrical resistivity $T_1$ is the higher temperature end $T_0$ is the lower temperature end, and $I_t$ is the current flowing through the current lead.

Thus, for minimizing the heat leak to a cooling medium, an increase of the section S has to correspond to an increase of the length L. It implies an overall size increasing of the current lead for minimizing both the heat leak and the refrigeration system cost, but this size increasing is not desirable in view of constructive and practical demands.

When superconducting material for the current lead conductor is employed, there is anyway an interface between the power generation/distribution network operating at higher temperature and the superconducting apparatus, hence the above mention problems of heat leak show up, before or after.

Applicant perceived that a current lead conductor with an extended length for decreasing the heat conduction and a reduced irradiating surface for restricting or even avoiding the use of a cryogenic fluid in direct contact with the conductor, could reduce the refrigerating system cost. An overall size reduction of the current lead conductor is also perceived as profitable.

SUMMARY OF THE INVENTION

In view of the previous considerations, the Applicant provides a current lead conductor in form of a radial succession of surfaces facing and connected one another, where the current sequentially flows through for a length suitable to reduce the conduction heat, and the irradiation heat is minimized both by a self-shielding effect and a limited irradiation surface in the proximity of the superconducting apparatus connection.

Therefore, in a first aspect, the present invention relates to an electric superconducting system including
 at least a superconducting apparatus
 at least a current lead, electrically connecting said superconducting apparatus and an electric network,
 wherein
said current lead comprises an electrical conductor comprising at least a sheet, said electrical conductor defining a heat conducting path of predetermined length through said sheet, and having at least two surfaces mutually facing to each other.

In the electric superconducting system according to the invention the superconducting apparatus comprises a volume containing a cryogenic fluid, and said current lead comprises a cryogenic fluid flowing channel, communicating with said cryogenic fluid containing volume of the superconducting apparatus.

The electrical conductor of the current lead is separated from the cryogenic fluid. Preferably, the cryogenic fluid is nitrogen.

The electric superconducting system of the invention comprises a vacuum pumping system, and the current lead is connected to said vacuum pumping system via a line including an outer electrical insulating conduit. Preferably, said connection between the outer electrical insulating conduit and the vacuum pumping system is through vacuum line.

The electric superconducting system of the invention comprises a cooling system, and the current lead is connected to said cooling system via a line including an inner electrical insulating conduit. Preferably, said connection between the outer electrical insulating conduit and the vacuum pumping system is through transfer line.

In a second aspect, the present invention relates to a current lead for superconducting apparatus, comprising:
 a high temperature lead/network interface,
 a cryostatic shield,
 an electrical conductor enclosed within said cryostatic shield, having two ends, the first end connected to a low temperature top connector and the second end connected to the high temperature lead/network interface,
wherein the electrical conductor comprises at least a sheet, said electrical conductor defining a heat conducting path of predetermined length through said sheet, and having at least two surfaces mutually facing to each other.

The electrical conductor of the invention can comprise at least two tubularly shaped sheets inserted one inside the other. Preferably, said tubularly shaped sheets are connected to each other at one end thereof.

The innermost of said tubularly shaped sheets is electrically connected to said low temperature top connector. The outermost of said tubularly shaped sheets is electrically connected to said high temperature lead/network interface.

The electrical conductor can comprise a sheet arranged in form in transversal cross section. The inner end of said spirally shaped sheet is electrically connected to said low temperature top connector. The outer end of said spirally shaped sheet is electrically connected to said high temperature lead/network interface.

In a third aspect, the present invention relates to a current lead for superconducting apparatus, comprising:
 a high temperature lead/network interface,
 a cryostatic shield,
 an electrical conductor enclosed within said cryostatic shield, having two ends, the first end connected to a low temperature top connector and the second end connected to the high temperature lead/network interface,
wherein the electrical conductor comprises at least a sheet having a substantially circular profile in transversal cross-section.

Preferably, said substantially circular profile in transversal cross-section is selected from spiral and circle.

Preferably, said electrical conductor is made of non-superconducting material. More preferably, said non-superconducting material is copper.

The cryostatic shield of the invention can be under vacuum.

Preferably, the cryostatic shield has electrically insulating connecting conduits.

In a fourth aspect, the present invention relates to a method for minimizing the heat leak through an electrical conductor of a current lead, which comprises the phases of:

providing a thermal conduction path of said electrical conductor with a predetermined length;

bringing a first surface of said electrical conductor to emit heat by irradiation in the direction of a second surface of said electrical conductor.

BRIEF DESCRIPTION OF THE DRAWINGS

Further features and advantages of the present invention will become more apparent from a detailed description of an embodiment of a system and a current lead according to the present invention. Such description is hereinbelow reported with reference to the enclosed figures.

DETAILED DESCRIPTION OF THE INVENTION

Figure 3:
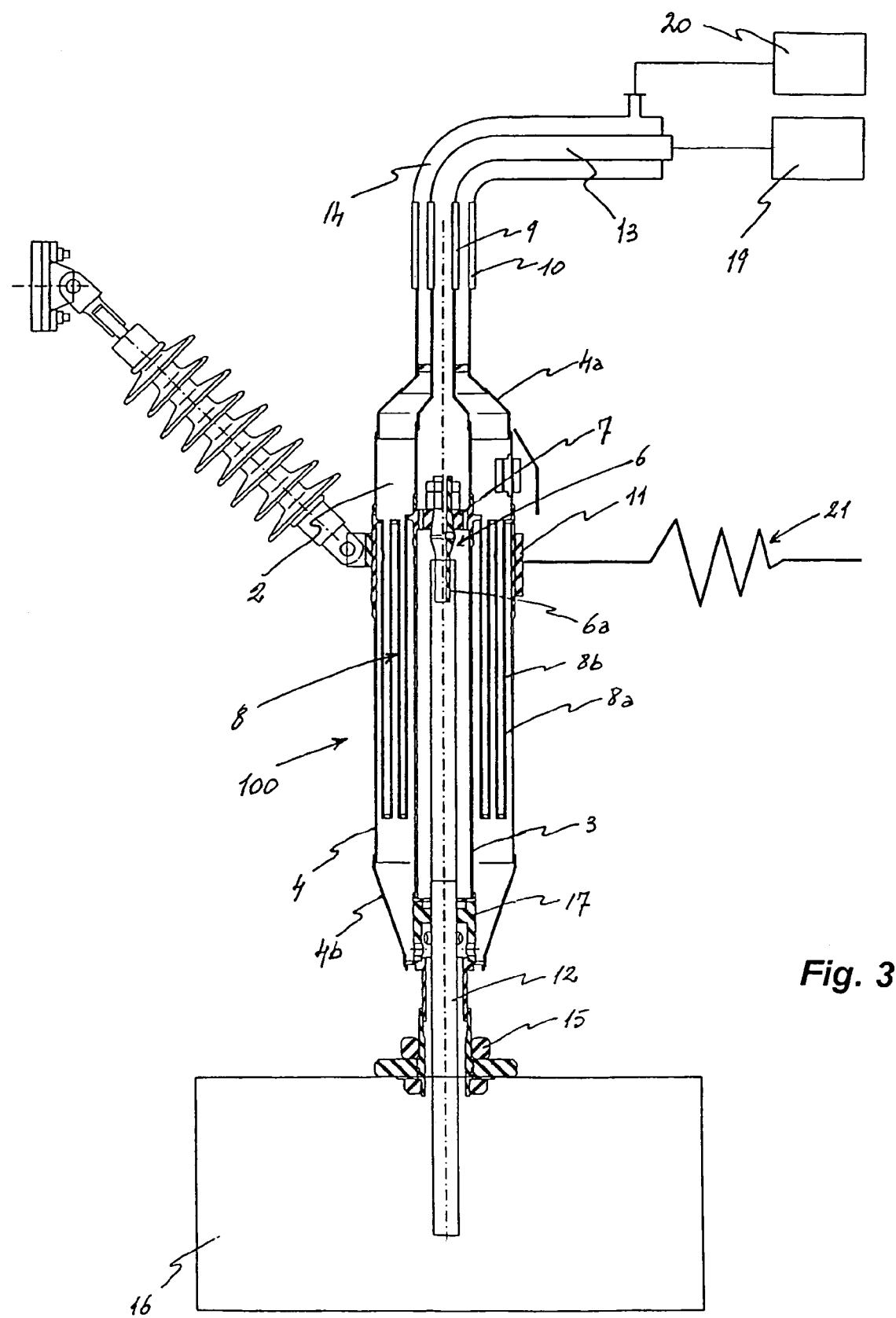
FIG. 3 shows a transversal section of a current lead connected to the electric superconducting system according to present invention.

An electric superconducting system according to the invention includes at least a superconducting apparatus 16, a cryostat associated thereto, a cryogenic fluid flowing in the superconducting apparatus, so as to maintain it in operative temperature, a vacuum line 14 connected to a pumping system 20, a transfer line 13 for said cryogenic fluid connected to a cooling system 19, and a current lead 100, connected to an electric network 21, as schematically shown in FIG. 3.

The current lead can be mechanically connected to a rigid support via an insulator, as shown in FIG. 3, as require to ensure the mechanical stability for the specific application.

Figure 1:
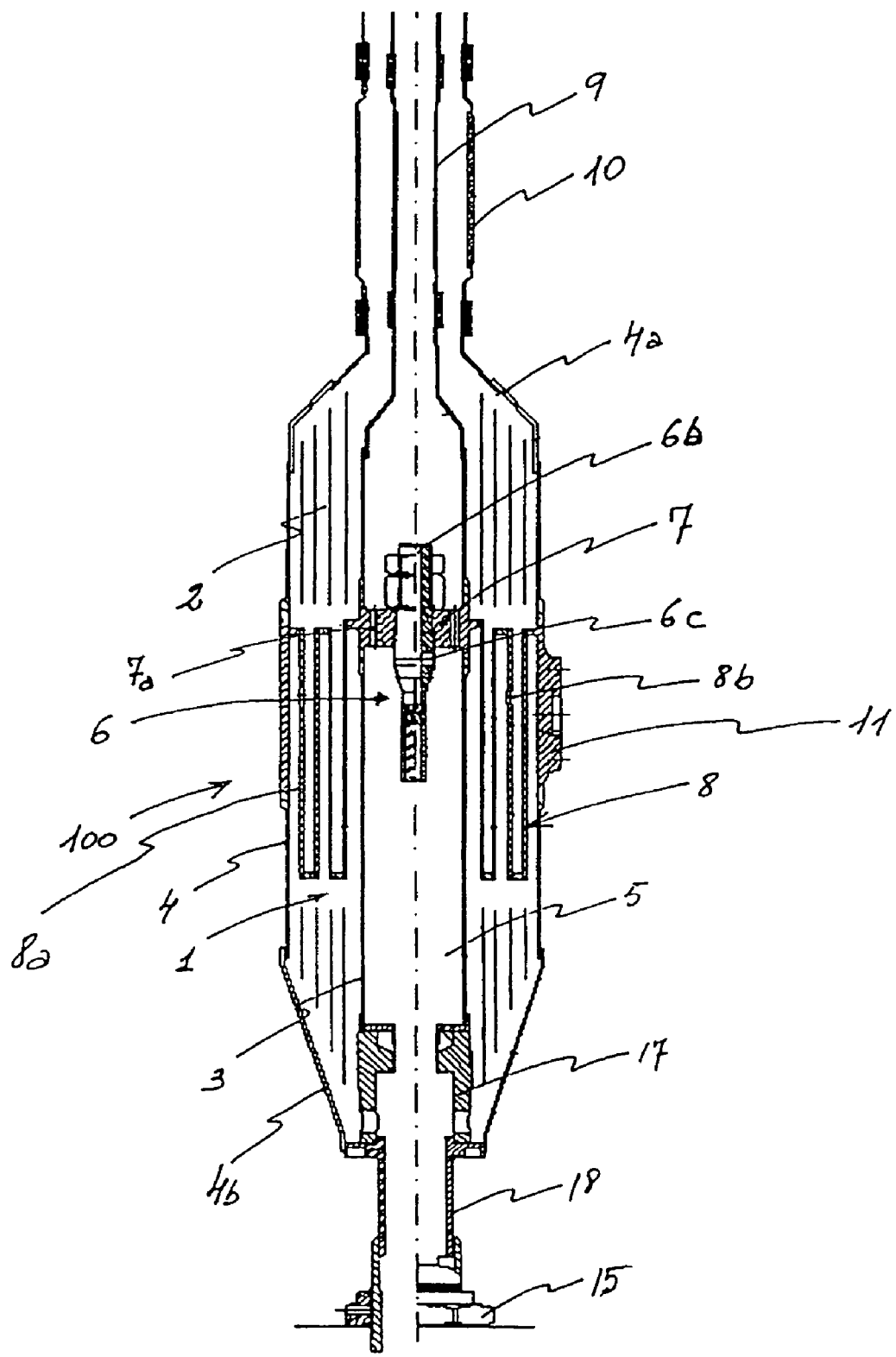
FIG. 1 shows a longitudinal section of a current lead according to the present invention.

The current lead 100 of the present invention, according to the embodiment depicted in FIG. 1, comprises a cryostatic shield 1, including an internal wall 3 and an external wall 4, substantially coaxial to one another.

The external wall 4 has upper and lower covers 4a, 4b, preferably conically shaped, respectively converging toward the upper and lower ends of the internal wall 3; an inner void volume 2 is defined between said internal wall 3 and external wall 4. The lower cover 4b is tightly connected to a connecting element 18.

The internal wall 3 defines a cryogenic fluid flowing channel 5 where a top connector 6 is positioned and connected to the surface of said internal wall 3 by a flange 7. Both top connector 6 and flange 7 are made in such a way that a cryogenic fluid may flows through them; for example, they are perforated, with respective bores 6b, 6c and 7a, as shown in FIG. 1.

The top connector 6 is mechanically and electrically joined to the flange 7, for example by screw-nut coupling. The flange 7 is, in turn, connected to the internal wall 3 and to the electrical conductor 8, the latter being contained in said inner void volume 2 of the cryostatic shield 1, for example by welding.

At the basis of the internal wall 3 an inner casing 17 is extended to form a connecting element 18 to the superconducting apparatus 16. The connecting element 18 ensures a passage connecting the cryostatic environment of the current lead and the cryostatic environment of the superconducting apparatus 16.

As shown in FIG. 3, a terminal conductor 12 of the superconducting apparatus 16 traverses the inner casing 17 ensuring tight separation between the cryostatic fluid flowing therethrough and the cryostatic environment (preferably under vacuum).

According to an aspect of the invention, conductor 8 is in form of at least one sheet having a substantially circular profile in transversal cross-section.

Figure 2:
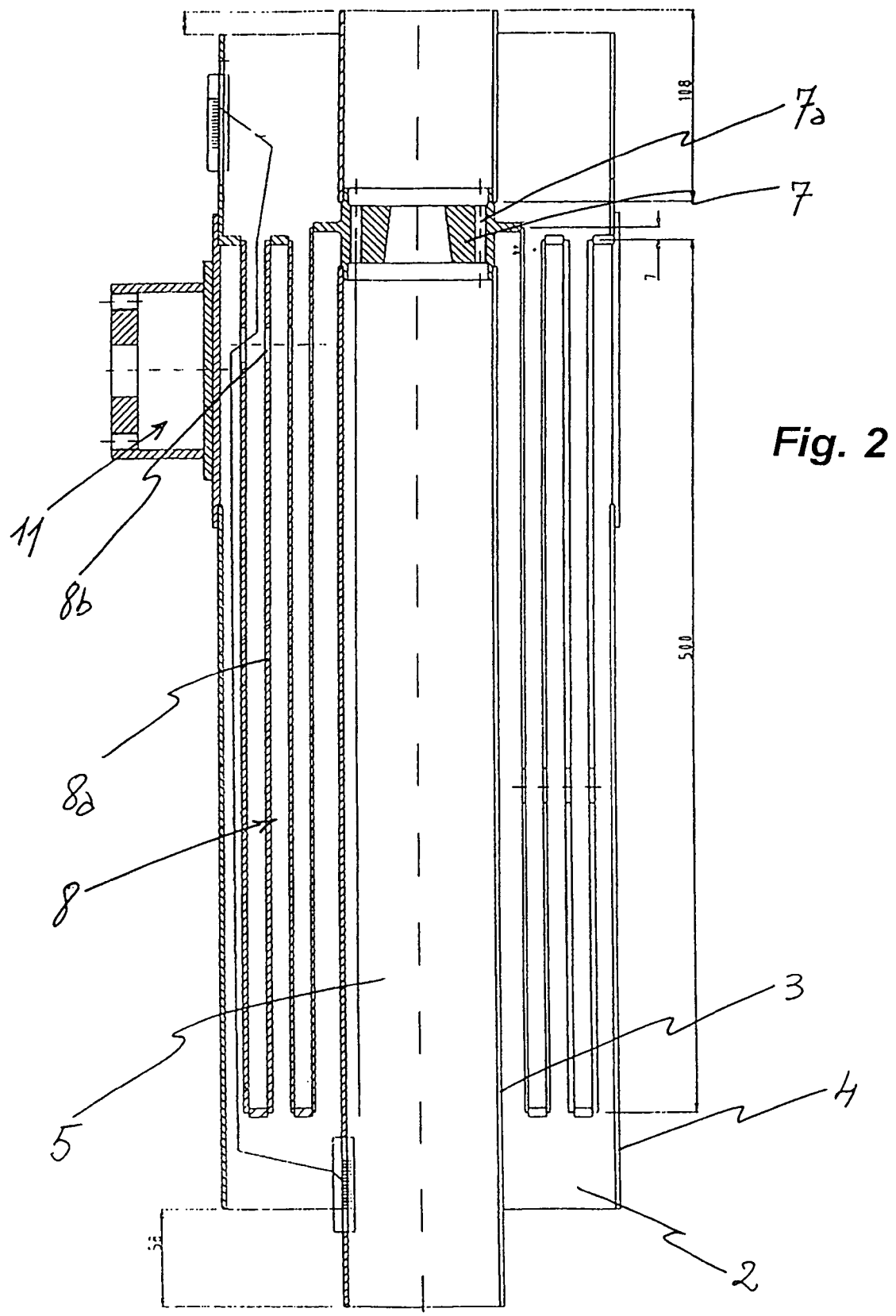
FIG. 2 shows an enlarged view of the current lead of FIG. 1 without the top connector therein depicted.
Figure 5:
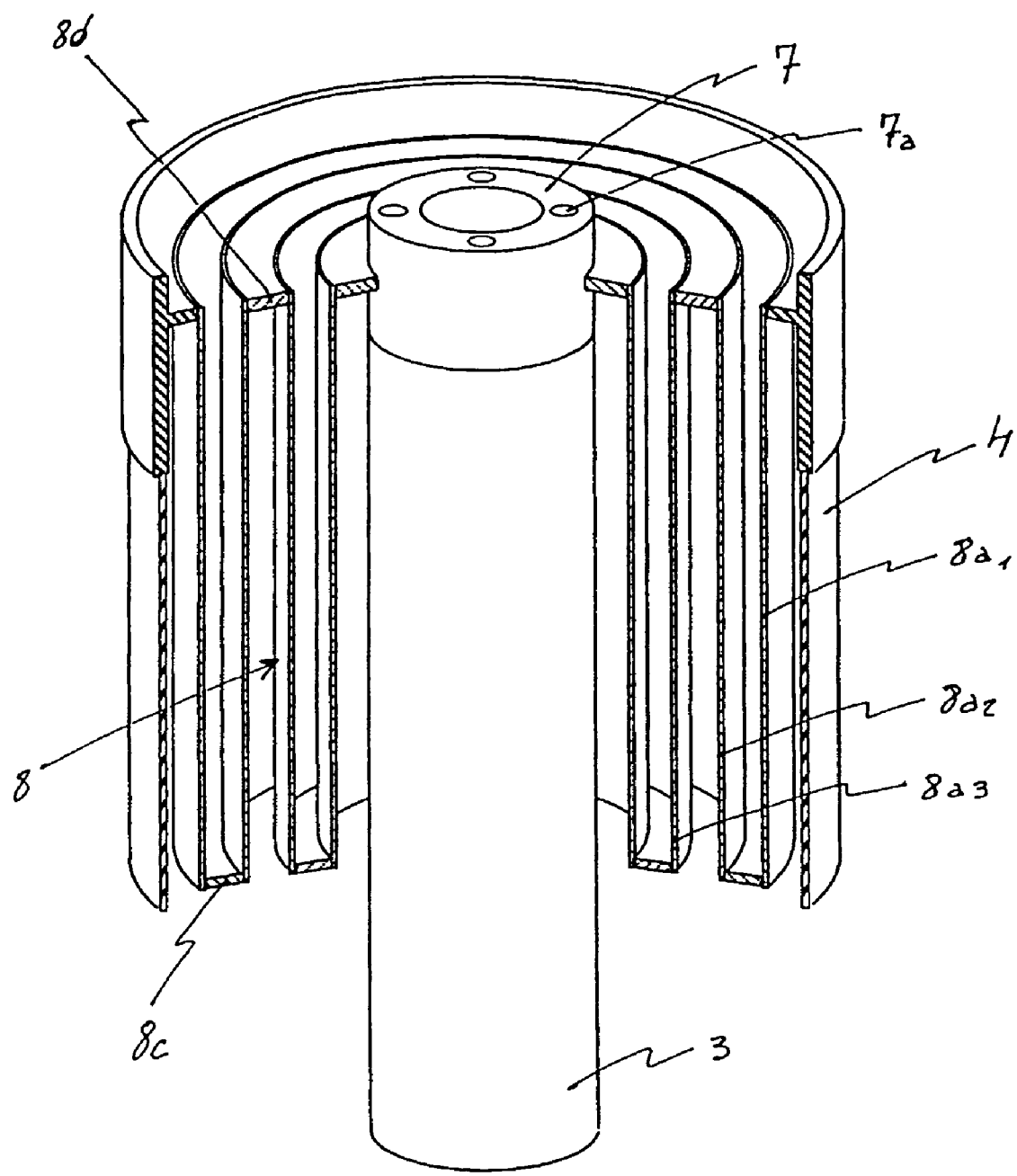
FIG. 5 shows a second embodiment of the electrical conductor of the current lead of the invention in perspective view, partly in cross-section.

In the embodiment of FIGS. 1 to 3 and 5, electrical conductor 8 comprises a plurality of sheets 8a, alternately connected one another through one of their edges. FIGS. 2, 5 illustrate in detail said configuration. Sheets 8a are made in such a way that the environment in said inner void volume 2 is homogeneous, for example they are perforated, with respective holes 8b.

Figure 4:
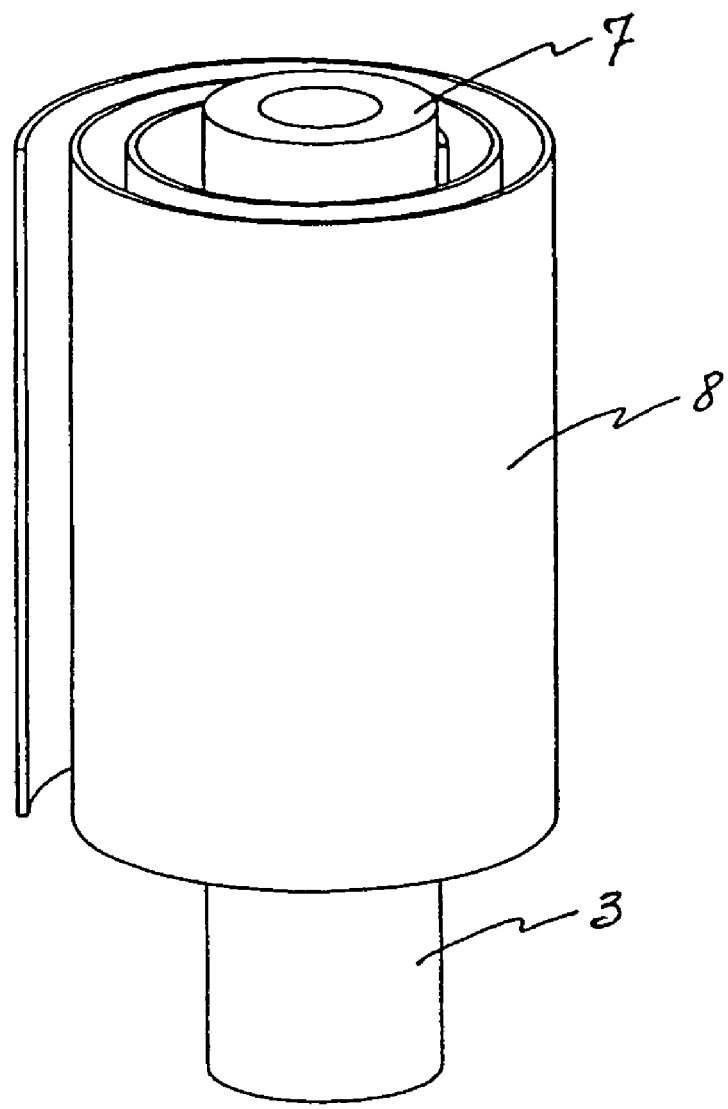
FIG. 4 shows an embodiment of the electrical conductor of the current lead of the invention in perspective view.

Electrical conductor 8 may be in non-superconducting material or, partially, in superconducting material. In the latter case, superconducting tapes or bars are positioned to form sheets 8a, optionally with the aid of a support. In the first case, a non-superconductive material sheet 8a may be conformed in spiral arrangement (FIG. 4) or, alternatively, a plurality of sheets $8a_1$, $8a_2$ etc are connected to one another in connection with one of their edges by means of respective connecting rings 8c, 8d, welded to the corresponding sheets ends (FIG. 5). Preferably, said non-superconducting material is copper.

In connection with the external wall 4, a lead/network interface 11 is provided, suitable for electrical connection to the electric network 21.

In the present embodiment, current lead 100 is provided with an inner electrical insulating conduit 9 and outer electrical insulating conduit 10, connected to one end of, respectively, said internal wall 3 and external wall 4 of said cryostatic shield 1, providing an electrically insulated connection of the current lead to the vacuum line and to the cooling system.

FIG. 3 shows an electric superconducting system according to the present invention, including a current lead 100. In particular, a terminal conductor 12 of a superconducting apparatus 16 is inserted into top connector 6, via a joint 6a. The internal wall 3 and external wall 4 are connected, respectively, to the transfer line 13, which is the extension of the cryogenic fluid flowing channel 5, and, in the present embodiment, to the vacuum line 14.

The transfer line 13 is connected to the cooling system 19. The vacuum line 14 is connected to the pumping system 20.

Base 15 of current lead 100 is fixed to the superconducting apparatus 16.

In operative conditions, inner void volume 2 of the cryostatic shield 1 is preferably under vacuum, at a pressure of, for example, $10^{-5}$-$10^{-6}$ mbar, or may contain a low thermally conductive gas, for example nitrogen, argon or neon.

In the first instance, cryostatic shield 1 may be connected to the pumping system 20 of the electrical superconducting system through said vacuum line 14. In such a way, cryostatic shield 1 and the cryostat of the superconducting apparatus form a single cryostatic entity. This embodiment is preferred by the present invention.

When said inner void volume 2 contains a low thermally conductive gas, said cryostatic shield 1 may be a closed system or may be connected to an independent gas supplier/controller. In said second instance, the low thermally conductive gas is other than the cryogenic fluid.

Inner void volume 2 may be at least partially filled with thermal insulating material, which may be selected from polyester resin tapes, poly-tetrafluoroethylene fibers or metallized Mylar® (DuPont Teijin Films trademark). Getters (i.e. gas absorbers made of sintered powder of, e.g., zirconium or titanium; see, for example, della Porta P., "Gettering—an Integral Part of Vacuum Technology", American Vacuum Society, 39$^{th}$ National Symposium, technical sheet TP 202) or zeolites may be placed in inner void volume 2.

Current lead 100 of the invention may comprise inner and outer electrical insulating conduits 9, 10, connected to one end of, respectively, said internal 3 and external 4 walls of said cryostatic shield 1. They may be positioned at the interface with said transfer line 13 and, in case, with said vacuum line 14. Said electrical insulating conduits are preferably in ceramic. Their use is preferred when the superconducting apparatus to be connected by the current lead of the invention to a power generation/distribution network is a superconducting cable.

In operative conditions, the cryogenic fluid flowing channel 5 is connected to transfer line 13, thus to the cooling system 19 of the electric superconducting system of the invention. The cryogenic fluid flowing in said channel 5 cools electrical conductor 8 indirectly, i.e. without a physical contact with it (convection cooling).

The cryogenic fluid is typically helium, nitrogen, hydrogen, argon or mixture thereof, at the liquid or gaseous state, and operates at temperature and pressure specific for the application. Preferably it is nitrogen.

In the example shown in FIG. 3, a terminal conductor 12 exits from the superconducting apparatus 16, and extends up to the top connector 6, to which it is electrically connected via a joint 6a.

The connection between the superconducting elements of the terminal conductor 12 coming from the superconducting apparatus 16 and the top connector 6 may be accomplished, for example, as described in the European patent application No. 01203197.7.

In an embodiment as shown in the figures, the overall length of the current lead 100, from upper and lower covers 4a, 4b, is of about 800 to 1000 mm and the diameter of the external wall 4 is of about 200 to 300 mm.

In such embodiment, the electrical conductor 8 is made of 4 coaxial copper tubes alternately connected to each other at their ends; the tubes have substantially the same length, which is about 50% of the total length of the current lead 100.

In this embodiment, the surfaces of the electrical conductor 8 are all facing to each other, apart from the internal surface of the innermost one of the tubes forming the electrical conductor 8, which is facing the internal wall 3, and the external surface of the outermost tube, facing the external wall 4.

Accordingly, the irradiated heat is reduced by a factor of about 5 with respect to a linearly extended conductor.

In general, the heat transmission by irradiation is reduced by a factor n+1, where n is the number of the coaxial tubes forming the conductor, according to the formula:

$$\dot{Q}_{irrad} \approx \frac{\sigma \cdot S \cdot (T_{warm}^4 - T_{cold}^4)}{n \cdot \left(\frac{1}{\varepsilon} - 1\right) + \left(\frac{1}{\varepsilon_{cold}} + \frac{1}{\varepsilon_{warm}} - 1\right)}$$

wherein:
$\dot{Q}_{irrad}$ Heat flow due to radiation [W/m]
σ Stefan-Boltzmann constant $5.7 \cdot 10^{-8}$ [W/m²]
$\varepsilon_x$ Surface emissivity of thermal shield, low temperature surface and high temperature surface
n Number of thermal shields (or reflective layers)
S Area of low temperature surface [m²]
$T_{warm}$ High temperature surface [K]
$T_{cold}$ Low Temperature surface [K].

In case of a conductor arrangement different from longitudinally coextensive, coaxial tubes, the calculating formula can be modified accordingly.

The superconducting apparatus of the present invention can be, in general, any superconducting apparatus having an internal portion maintained at low temperature and thermally insulated from the ambient, where electrical connection of a superconductor located in said internal portion to a resistive type conductor is required; preferably, the superconducting apparatus is a magnet or a superconducting cable.

The current lead of the present invention ensures a convenient electrical connection between a superconducting apparatus and a power distribution/generation network.

Its reduced size makes particularly suitable for installation in buildings. For example, it is shorter than 1 meter for a 24 kV 2000 Amps cable.

Thanks to the self-heat-shielding configuration of the conductor contained therein, not direct cooling is requested by the cryogenic fluid, thus reducing the heat leak to said fluid and, as a consequence, decreasing the refrigeration cost.

What is claimed is:

1. An electric superconducting system comprising:
   at least a superconducting apparatus;
   at least a current lead electrically connecting said superconducting apparatus and an electric network,
   said current lead comprising an electrical conductor, the electrical conductor comprising a sheet having two ends, the first end connected to the superconducting apparatus and the second end connected to the electric network, said electrical conductor defining a heat conducting path of predetermined length through said sheet and having at least two surfaces mutually facing and spaced apart from each other.

2. The electric superconducting system according to claim 1, wherein the superconducting apparatus comprises a volume containing a cryogenic fluid and said current lead comprises a cryogenic fluid flowing channel communicating with said cryogenic fluid containing volume of the superconducting apparatus.

3. The electric superconducting system according to claim 2, wherein the electrical conductor is separated from the cryogenic fluid.

4. The electric superconducting system according to claim 3, wherein the cryogenic fluid is nitrogen.

5. The electric superconducting system according to claim 2, further comprising a cooling system wherein the current lead is connected to said cooling system via a line including an electrical insulating conduit.

6. The electric superconducting system according to claim 1, further comprising a vacuum pumping system, wherein the current lead is connected to said vacuum pumping system via a line including an outer electrical insulating conduit.

7. A current lead for superconducting apparatus, comprising:
   a high temperature lead/network interface;
   a cryostatic shield;
   an electrical conductor enclosed within said cryostatic shield having two ends, the first end connected to a low temperature top connector and the second end connected to the high temperature lead/network interface;
   the electrical conductor comprising at least a sheet, said electrical conductor defining a heat conducting path of predetermined length through said sheet and having at least two surfaces mutually facing and spaced apart from each other.

8. The current lead according to claim 7, wherein the electrical conductor comprises at least two tubularly shaped sheets inserted one inside the other.

9. The current lead according to claim 8, wherein said tubularly shaped sheets are connected to each other at one end thereof.

10. The current lead according to claim 8, wherein the innermost of said tubularly shaped sheets is electrically connected to said low temperature top connector.

11. The current lead according to claim 8, wherein the outermost of said tubularly shaped sheets is electrically connected to said high temperature lead/network interface.

12. The current lead according to claim 11, wherein the inner end of said spiral is electrically connected to said low temperature top connector.

13. The current lead according to claim 11, wherein the outer end of said spiral is electrically connected to said high temperature lead/network interface.

14. The current lead according to claim 7, wherein the electrical conductor comprises a sheet arranged in spirally shaped form in transversal cross section.

15. A current lead for superconducting apparatus, comprising:
- a high temperature lead/network interface;
- a cryostatic shield;
- an electrical conductor enclosed within said cryostatic shield having two ends, the first end connected to a low temperature top connector and the second end connected to the high temperature lead/network interface,
- the electrical conductor comprising at least a sheet having at least two surfaces mutually facing and spaced apart from each other.

16. The current lead according to claim 15, wherein the conductor is made of non-superconducting material.

17. The current lead according to claim 16, wherein the non-superconducting material is copper.

18. The current lead according to claim 15, said sheet having a substantially circular profile in transversal cross-section.

19. The current lead according to claim 18, wherein said substantially circular profile in transversal cross-section is selected from spiral and circle.

20. The current lead according to claim 17, wherein the cryostatic shield is under vacuum.

21. The current lead according to claim 19, wherein the cryostatic shield has electrically insulating connecting conduits.

* * * * *

UNITED STATES PATENT AND TRADEMARK OFFICE
CERTIFICATE OF CORRECTION

PATENT NO.        : 7,928,321 B2
APPLICATION NO.   : 10/515834
DATED             : April 19, 2011
INVENTOR(S)       : Corsaro et al.

It is certified that error appears in the above-identified patent and that said Letters Patent is hereby corrected as shown below:

Title page, (73) Assignee: "Pirelli & C. Sp.A." should read --Prysmian Cavi e Sistemi Energia S.r.l.--.

Signed and Sealed this
Eighth Day of November, 2011

David J. Kappos
*Director of the United States Patent and Trademark Office*